(12) United States Patent
Kang

(10) Patent No.: US 6,938,100 B2
(45) Date of Patent: Aug. 30, 2005

(54) METHOD FOR SYNCHRONIZING DATA BETWEEN MOBILE TERMINAL AND COMPUTER

(75) Inventor: Jung Sik Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 658 days.

(21) Appl. No.: 09/740,848

(22) Filed: Dec. 21, 2000

(65) Prior Publication Data

US 2001/0005364 A1 Jun. 28, 2001

(30) Foreign Application Priority Data

Dec. 22, 1999 (KR) ........................................ 1999-60316

(51) Int. Cl.$^7$ .......................... G06F 15/16; H04B 1/034; H04M 15/06; H04L 12/28
(52) U.S. Cl. .................. 709/248; 709/200; 379/142.15; 455/95; 370/900; 370/913
(58) Field of Search ............................... 709/248, 200; 7007/201, 203; 370/900, 913; 379/142.15; 455/95

(56) References Cited

U.S. PATENT DOCUMENTS

| | | | |
|---|---|---|---|
| 5,727,202 A | * | 3/1998 | Kucala ........................ 707/10 |
| 5,884,323 A | * | 3/1999 | Hawkins et al. ............. 707/201 |
| 6,304,881 B1 | * | 10/2001 | Halim et al. ................. 707/201 |
| 6,304,914 B1 | * | 10/2001 | Deo et al. .................... 709/247 |
| 6,330,618 B1 | * | 12/2001 | Hawkins et al. ............. 709/248 |
| 6,377,799 B1 | * | 4/2002 | Hameleers et al. ........ 455/422.1 |

* cited by examiner

Primary Examiner—Zarni Maung
Assistant Examiner—Hassan Phillips
(74) Attorney, Agent, or Firm—Fleshner & Kim, LLP

(57) ABSTRACT

A method for synchronizing data between a mobile terminal and a computer is provided, in which schedule data can be synchronized between the mobile terminal and the computer using a radio network and Internet network. In this method, either a mobile terminal or a computer corresponding to a party requesting data to synchronize transmits its head data to another party for synchronizing data through an Over-The-Air Function (OTAF) system. The party synchronizing data compares the transmitted head data with its head data, and transmits its newest data and corresponding head data in accordance with the comparison result. The requesting party stores the newest data, and transmits its newest data to the parry for synchronizing data through the OTAF system. Then, the party for synchronizing data stores the newest data of the party for requesting data to synchronize in its memory area.

17 Claims, 7 Drawing Sheets

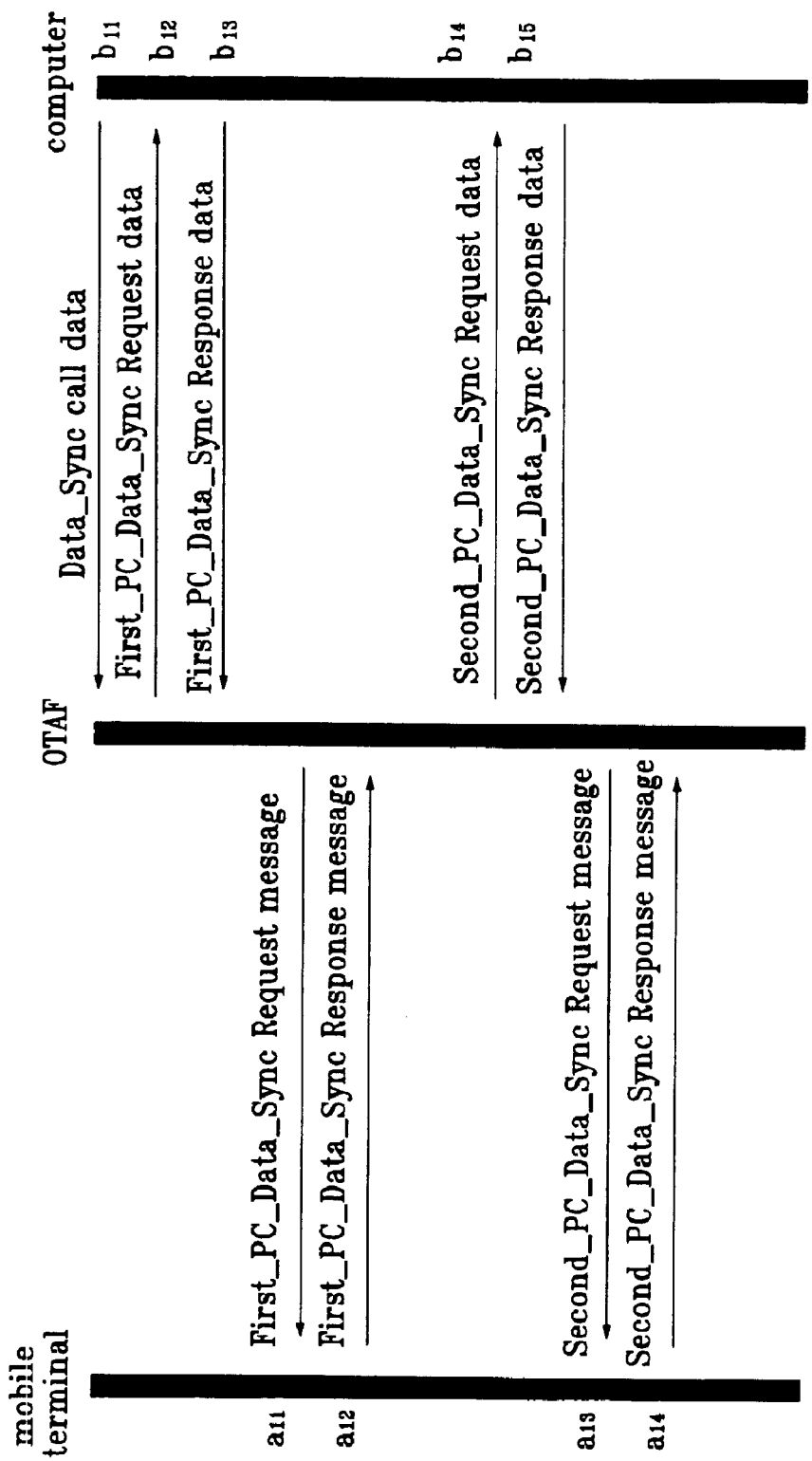

FIG.7a

Ph_Data_Sync Call Message

| CMD |
|-----|

← CMD : Command 0 0 0 0 0   :5 Bit

First_PH_Data_Sync Request Message

| CMD |
|-----|

0 0 0 0 1

First_Ph_Data_Sync Response Message

| CMD | Terminal Head Data |
|-----|--------------------|

0 0 0 1 1

First_PC_Data_Sync Request Message

| CMD | PC Head Data |
|-----|--------------|

0 0 0 1 1

First_PC_Data_Sync Response Message

| CMD | Terminal Newest Data | PC Newest Data Head |
|-----|----------------------|---------------------|

Second_Ph_Data_Sync Request message

| CMD | PC Newest Data | Terminal Newest Data Head |
|---|---|---|

0 0 1 0 1

Second_Ph_Data_Sync Response message

| CMD | Terminal Newest Data |
|---|---|

0 0 1 1 0

First_Ph_Data_Sync Request Data

| CMD | Terminal Data Head |
|---|---|

1 0 0 1 1

First_Ph_Data_Sync Response Data

| CMD | PC Newest Data | Terminal Newest Data Head |
|---|---|---|

1 0 1 0 0

Second_PC_Data_Sync Request Data

| CMD | Terminal Newest Data | PC Newest Data Head |
|---|---|---|

Second_PC_Data_Sync Response Data

| CMD | PC Newest Data |
|---|---|

10110

Second_Ph_Data_Sync Request Data

| CMD | Terminal Newest Data |
|---|---|

10111

Second_PC_Data_Sync Response Data

| CMD |
|---|

11000

METHOD FOR SYNCHRONIZING DATA BETWEEN MOBILE TERMINAL AND COMPUTER

BACKGROUND OF THE INVENTION

1. Field of the Invention

The present invention relates to a method for synchronizing data between a mobile terminal and a computer.

2. Background of the Related Art

Generally, a mobile communication system includes a mobile station (terminal), a base transceiver station (BTS), a base station controller (BSC), and a mobile switching center (MSC). Of them, the terminal is a mobile terminal such as a digital cellular network (DCN) and a personal communication service (PCS). The BTS converts a signal format between the mobile terminal and the BSC to be suitable for a radio link and a cable link. The BSC is a connection means between respective elements of the BTS and a cell operator, and performs operation and management of the BTS, management of services of hardware and software within the BTS, allocation and configuration of resources for call traffic, collection of data for operation of the BTS, and a monitoring function of other equipment related to operation and monitor of the BTS. The MSC manages the BSC and includes an access point for user traffic between a mobile communication network and a general phone network or between MSCs of a mobile communication system.

Generally, examples of the mobile terminal include a simple bar type, a flip type with a cover and a key pad of the bar type, and a folder type capable of folding a liquid crystal display (LCD) portion of the mobile terminal and a key pad portion thereof. Recently, a watch type mobile terminal has been developed.

Such a mobile terminal has been initially used for voice communication only but is being recently used for data communication. For example, the mobile terminal is used for location information services, e-mail confirmation services during movement using an Internet function that enables access Internet without computer, and electronic commercial transaction services such as stock service and advance purchase service of airline tickets or train tickets.

Recently, a mobile terminal having various functions has been developed. That is, the recently developed mobile terminal has functions such as listening function of AM or FM radio reception, or downloading and playback function of MP3 music from the Internet. A method for storing MP3 files in such a mobile terminal includes connecting the mobile terminal with a personal computer (PC) by a receptacle using a multimedia card and downloading the MP3 files from the Internet or PC.

The receptacle may include a cable for access to Internet or PC using a mobile terminal. One side of the receptacle is connected with data communication terminal typically located in a lower portion of the mobile terminal while its other side is connected with a printer port of the PC, so that MP3 music on the Internet or PC can be transmitted from the PC to a memory of the mobile terminal.

With both the spread of mobile terminals due to extension of radio services and development of new types of mobile terminals having various functions, users continue to purchase new mobile terminals.

It is known that the exchange period of such a mobile terminal is six months to two years.

The mobile terminal provides a list of phone numbers, a schedule management function, and personal information management function. The list of phone numbers can allow the user to store frequently used phone numbers in a memory of the mobile terminal. In case of a new mobile terminal, a larger quantity of telephone numbers, schedule management data, and personal information management data can be stored in the memory.

A method for inputting phone numbers and other information in an address list includes inputting them one by one using a key pad of the mobile terminal, or transmitting data stored in the PC to the mobile terminal using a receptacle after connecting the PC with the mobile terminal using a cable. Furthermore, data of the mobile terminal may be transmitted to the PC, so that data can be exchanged between the mobile terminal and the PC.

A related art method for exchanging data between a mobile terminal and a computer will be described with reference to the accompanying drawings.

FIG. 1 is a diagram illustrating a related art method for exchanging data between a mobile terminal and a computer.

In this related art method for exchanging data between the mobile terminal and the computer, the data are exchanged between the mobile terminal and the computer using radio communication. This method is recently becoming the major concern. Referring to FIG. 1, a mobile terminal 1 provided with an infrared ray radio transceiver 3 faces a computer 2 provided with an infrared ray radio transceiver 4 at a constant range of about 30°~60° within a constant distance of 1~3 m. Then, data organized in the mobile terminal 1 are transmitted to the computer 2. Alternatively, data of the address list are organized in the computer 2 using an information management program and then transmitted to the mobile terminal 1. If the transmitting steps are completed, the mobile terminal 1 and the computer 2 respectively store the received data in their memory. Thus, exchange and synchronization of the data between the mobile terminal 1 and the computer 2 are completed. 4

FIG. 2 is a diagram illustrating another related art method for exchanging data between the mobile terminal and the computer.

In this related art method, the data are exchanged between the mobile terminal and the computer using a receptacle.

In other words, the data of the mobile terminal are managed using a kind of cable. After a data terminal of the mobile terminal 1 is connected with a printer terminal of the computer 2 through a receptacle 5, the computer 2 organizes the data of the address list and the like using an information management program of the mobile terminal 1. The computer 2 then transmits the organized data to the mobile terminal 1. Alternatively, the mobile terminal 1 organizes the data and then transmits the organized data to the computer 2. If the respective transmitting steps are completed, the mobile terminal 1 and the computer 2 respectively store the received data in their memory. Thus, exchange and synchronization of the data between the mobile terminal 1 and the computer 2 are completed.

However, the aforementioned related art methods for exchanging a mobile terminal and a computer have several problems.

First, in case of radio communication, the computer and the mobile terminal should respectively be provided with appropriate transceivers.

Second, to synchronize the data between the mobile terminal and the computer, the receptacle which is a serial cable is used. Accordingly, it is impossible to synchronize the data under the environment having no serial cable. In addition, since no receptacle is included in a set of the mobile terminal, additional cost for the receptacle is required. Moreover, a drawback arises in that the receptacle is not almost used.

Finally, it is impossible to synchronize the data in case where the mobile terminal is far away from the computer.

SUMMARY OF THE INVENTION

Accordingly, the present invention is directed to a method for synchronizing data between a mobile terminal and a computer that substantially obviates one or more of the problems due to limitations and disadvantages of the related art.

An object of the present invention is to provide a method for synchronizing data between a mobile terminal and a computer in which schedule data can be synchronized between the mobile terminal and the computer using a radio network and Internet network.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an aspect of the present invention to achieve these and other advantages and in accordance with the purpose of the present invention, either a mobile terminal or a computer corresponding to a party for requesting data to synchronize transmits its head data to other party for synchronizing data through an Over-The-Air Function (OTAF) system. The party for synchronizing data compares the transmitted head data of the party requesting data to synchronize with its head data, and transmits its newest data and corresponding head data of the party for requesting data to synchronize to the party for requesting data to synchronize in accordance with the comparison result. The party for requesting data to synchronize stores the newest data from the party for requesting data, and transmits its newest data to the party for synchronizing data through the OTAF system. Then, the party for synchronizing data stores the newest data of the party for requesting data to synchronize in its memory area. Thus, the method for synchronizing data between the mobile terminal and the computer ends.

Preferably, a confirmation message may further be transmitted to the party for requesting data to synchronize through the OTAF system after the party for synchronizing data stores the newest data of the party for requesting data to synchronize in its memory area.

In another aspect of the present invention, either a mobile terminal or a computer corresponding to a party for requesting data to synchronize transmits its entire data to the other party for synchronizing data through an OTAF system. At this time, the party for synchronizing data compares head data with head data of the party requesting data to synchronize, and stores data which did not previously exist among the data of the party for requesting data to synchronize in accordance with the comparison result The party 4 for synchronizing data transmits its data which did not previously exist to the party for requesting data to synchronize, to the party for requesting data to synchronize through the OTAF system. The party for requesting data to synchronize stores the data transmitted from the party for synchronizing data in its memory area. Thus, the method for synchronizing data between the mobile terminal and the computer ends.

In the preferred embodiment of the present invention, schedule data between the terminal and the computer can be synchronized on a radio line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6 is a diagram illustrating a method for synchronizing schedule data between a mobile terminal and a computer in accordance with the second embodiment of the present invention; and FIGS. 7a to 7c are diagrams illustrating data formats of messages used in the first and second embodiments of the present invention.

DETAILED DESCRIPTION OF THE PREFERRED EMBODIMENTS

Reference will now be made in detail to the preferred embodiments of the present invention, examples of which are illustrated in the accompanying drawings.

Figure 1:
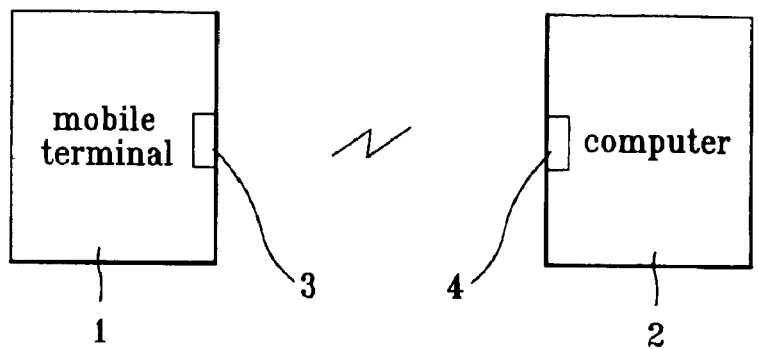
FIG. 1 is a diagram illustrating a related art method for exchanging data between a mobile terminal and a computer.
Figure 2:
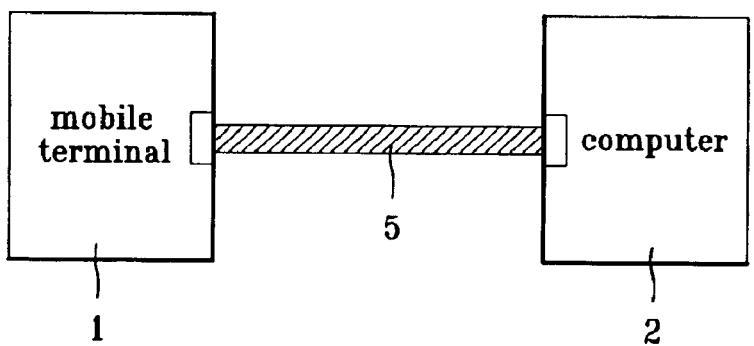
FIG. 2 is a diagram illustrating another related art method for exchanging data between a mobile terminal and a computer.
Figure 3:
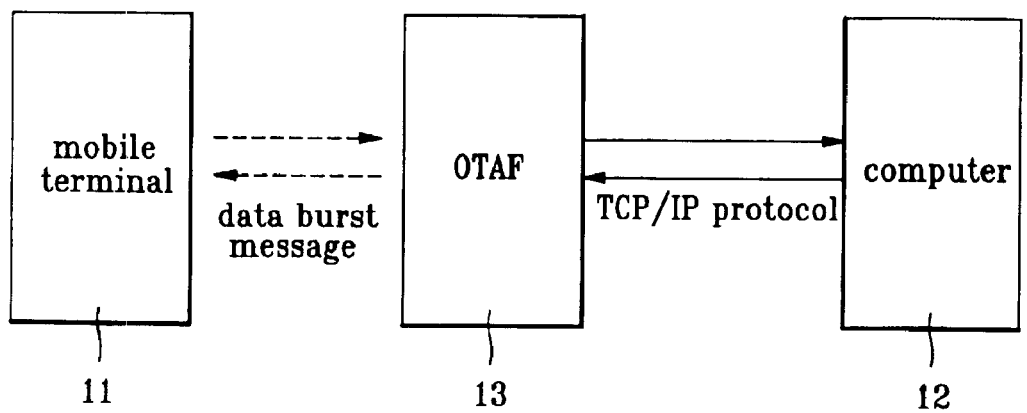
FIG. 3 is a diagram illustrating a method for exchanging schedule data between a mobile terminal and a computer in accordance with the present invention.

FIG. 3 is a diagram illustrating a method for exchanging schedule data between a mobile terminal and a computer in accordance with the present invention.

Referring to FIG. 3, a reference numeral 11 denotes a mobile terminal, a reference numeral 12 denotes a computer for synchronizing schedule data with the mobile terminal 11. A reference numeral 13 denotes an OTAF system. The OTAF system 13 transmits radio data from the mobile terminal 11 to the computer 12 through Internet between the mobile terminal 11 and the computer 12. Alternatively, the OTAF system 13 transmits the data from the computer 12 to the mobile terminal 11 through Internet in a radio data format.

The OTAF system will briefly be described.

The OTAF is a new technology that enables open marketing of a mobile communication provider. A route for subscribing a mobile communication system through an existing agent or special agent has a problem in that subscribers directly visit the agent to purchase a mobile terminal (or cellular phone) and activate the subscription. However, a route for subscribing a mobile communication system through the OTAF system solves any inconvenience to visit the agent, thereby providing convenience to subscribers when subscribing the mobile communication system. Accordingly, the OTAF system has an advantage that can increase subscribers.

The OTAF system interacts with subscribers' mobile terminals, a BTS, an MSC, an OTAF system, a customer service base station (CSBS), and a home location register (HLR which is an equipment having data of subscribers' mobile terminals registered in real time). The MSC gives a temporary reference number to allow a mobile terminal, which is not subscribed, to access a network. The mobile terminal which was given a temporary reference number is connected with the OTAF system and a counselor of the CSBS through the MSC. If a subscriber presses a special number for connection to the OTAF system, the mobile terminal is connected with the counselor of the CSBS or an ARS equipment. The mobile terminal sets call with the temporary reference number given by the MSC to set call of a mobile terminal which is not opened, and then accesses the OTAF system using a protocol of a number 7. At the same time, the subscriber is connected with the counselor of the CSBS through an inter gateway system (IGS) which is an equipment for connecting call with other communication service provider's network or equipment.

Interface among the MSC, the OTAF system, the HLR, and an authentication center (AUC) is connected with a private automatic branch exchange (PABX) of the CSBS through a protocol R2 from the IGS using a protocol of a number 7. The AUC is an equipment for authentication of a subscriber's mobile terminal. The PABX of the CSBS is configured in such a manner that a termination signal incoming by pressing a special origination number is routed with internally grouped numbers, thereby connecting with a special counselor.

The configuration for synchronizing schedule data between the mobile terminal 11 and the computer 12 in accordance with the present invention enables synchronization of the schedule data between the mobile terminal 11 and the computer 12 by using a currently used Over-The Air Service Provisioning (OTASP) message regardless of additional equipment or distance within all of the areas within the range that the mobile terminal 11 is connected with the BTS.

To synchronize the mobile terminal 11 with the schedule data set in the computer 12, a user of the mobile terminal 11 transmits the schedule data to the OTASP message through a radio network. The OTAF system 13 transmits the schedule data to its computer 12 connected with Internet network, through the Internet network, so as to update relevant data in the computer 12. Subsequently, the relevant data in the computer 12 are transmitted to the OTAF system 13 through the Internet network. The OTAF system 13 transmits the relevant data to the mobile terminal 11 using the OTASP message. Accordingly, the relevant data in the mobile terminal 11 are updated again, and the schedule data between the mobile terminal 11 and the OTAF system 13 are synchronized.

When transmitting and receiving data between the mobile terminal 11 and the OTAF system 13, the data are transmitted in a data burst message type such as a short message service (SMS) A transmission control protocol/Internet protocol (TCP/IP) is used between the computer 12 and the OTAF system 13.

Meanwhile, although not shown, the BTS and the MSC are located between the mobile terminal 11 and the OTAF system 13, as is well known. However, description of the BTS and the MSC will be omitted.

The OTASP will be described in brief.

The OTASP is intended to solve any inconvenience of the mobile terminal's subscriber in visiting the mobile communication agent to register and subscribe the mobile communication services. That is to say, according to the OTASP, after the mobile terminal's subscriber purchases a mobile terminal through a convenience store or other agents, the subscriber can directly subscribe and use the mobile communication services using the purchased mobile terminal.

Meanwhile, specific services of the mobile communication services include voice services, data services, and multimedia services. Various specific services based on the data services have been suggested in the mobile communication services. The OTASP service is one of the various specific services. The OTASP service simplifies complicate registration procedures between the subscriber and the mobile communication service provider through reliable data communication using voice call. That is, the OTASP service provides a function that allows the subscriber to safely and surely perform the registration procedure in real time.

Figure 4:
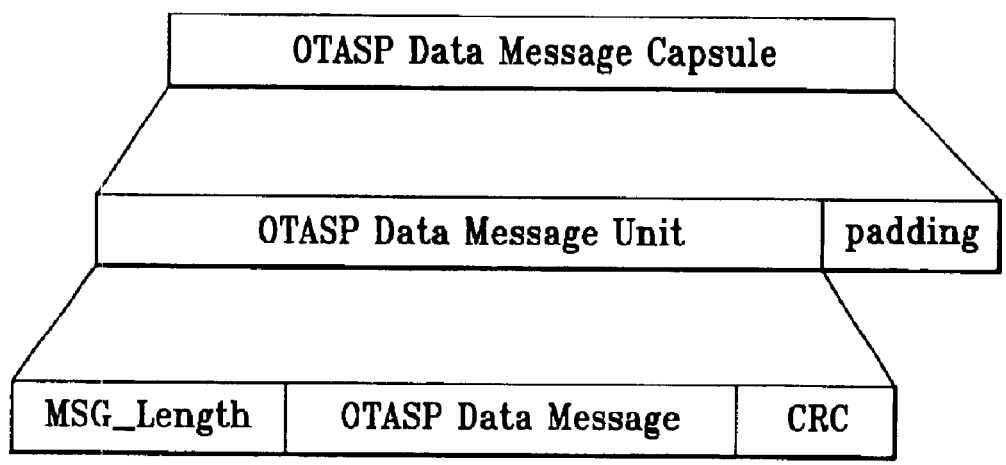
FIG. 4 is a diagram illustrating an OTASP data message format.

FIG. 4 is a diagram illustrating a format of the OTASP data message. Referring to FIG. 4, a portion of the OTASP data message means a portion to which real data required for synchronization are input.

First Embodiment

Figure 5:
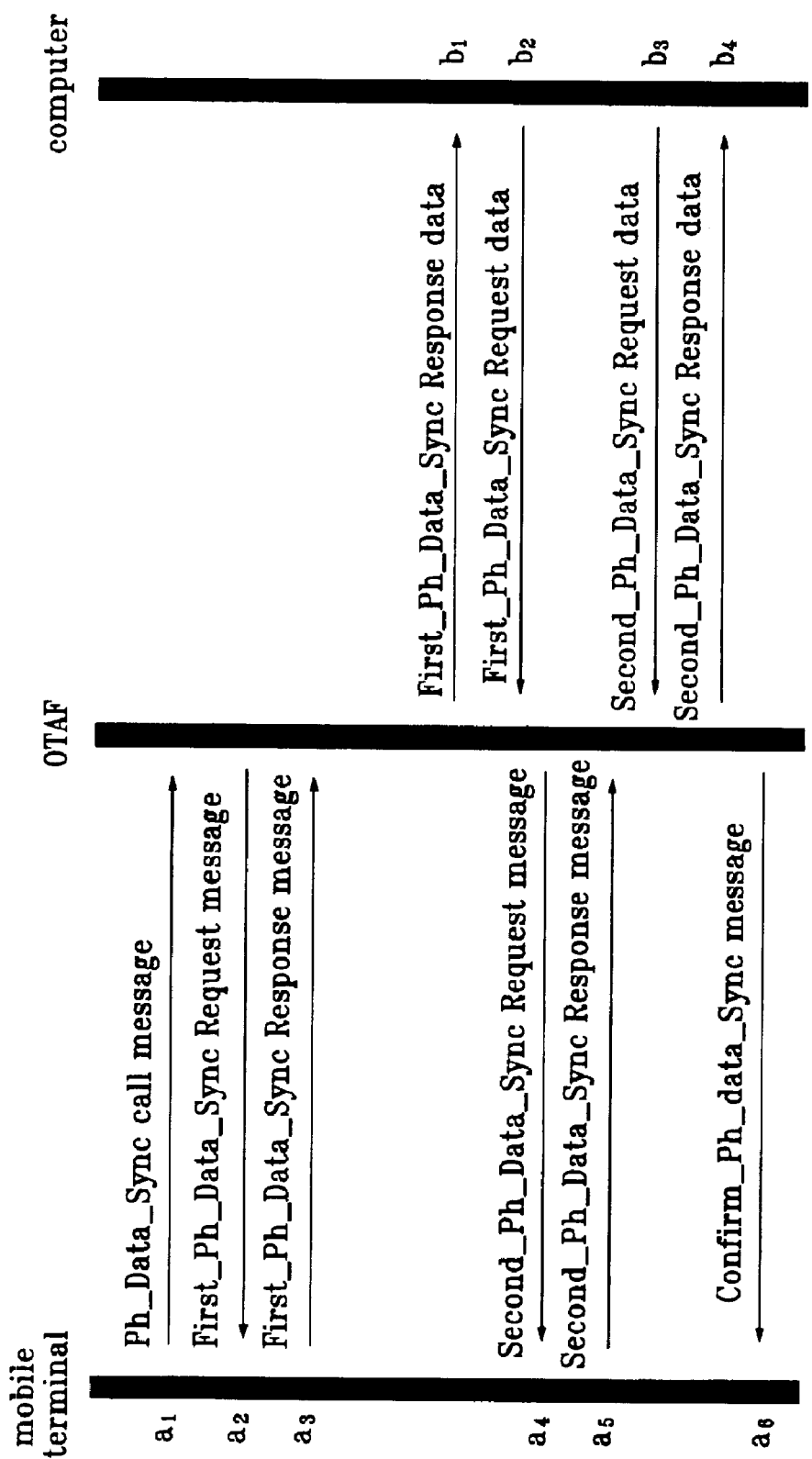
FIG. 5 is a flow chart illustrating a method for synchronizing schedule data between a mobile terminal and a computer in accordance with the first embodiment of the present invention.

FIG. 5 is a flow chart illustrating a method for synchronizing schedule data between a mobile terminal and a computer in accordance with the first embodiment of the present invention.

Referring to FIG. 5, if the user of the mobile terminal 11 presses a synchronizing button (not shown) of a schedule program on a key pad during using a menu program of the mobile terminal 11, the mobile terminal 11 transmits Ph_Data_Sync call message to the OTAF system 13 (a1).

Then, the OTAF system 13 transmits First_Ph_Data_Sync_Request message to the mobile terminal 11 (a2).

The mobile terminal 11 transmits a head portion of the schedule data currently stored in the mobile terminal 11 together with First_Ph_Data_Sync_Response message to the OTAF system 13 (a3).

The OTAF system 13 transmits First_Ph_Data_Sync_Request data to the computer 12 through the Internet network (b1).

The computer 12 compares the head portion of the schedule data stored in the mobile terminal 11 with a head portion of the schedule data currently stored in the computer 12 using the First_Ph_Data_Sync_Request data, so as to determine whether the data transmitted from the OTAF system 13 are the newest data, the same data as its data, or already received data. The computer 12 transmits all the newest data in the computer 12 and a head portion of the newest data received from the mobile terminal 11 to the OTAF system 13 together with the First_Ph_Data_Sync_Response data (b2).

At this time, the OTAF system 13 transmits Second_Ph_Data_Sync_Request message to the mobile terminal 11 through a traffic channel (a4).

The mobile terminal 11 stores the newest schedule data of the computer 12 from the received Second_Ph_Data_Sync_Request message in its memory area, and transmits data among its schedule data, corresponding to the head portion of the newest schedule data of the computer 12, to the OTAF system 13 through the traffic channel of the radio network in the Second_Ph_Data_Sync_Response message type (a5).

The OTAF system 13 transmits the data transmitted from the mobile terminal 11 to the computer 12 through the Internet network together with the Second_Ph_Data_Sync_Request message (b3).

Meanwhile, the computer 12 stores the received newest schedule data of the mobile terminal 11 in its memory area, and transmits a confirmation message together with the Second_Ph_Data_Sync_Response data to the OTAF system 13 (b4).

Finally, the OTAF system 13 transmits the confirmation message from the computer 12 to the mobile terminal 11 through the traffic channel in a Confirm_Ph_Data_Sync_ message type. Thus, synchronization of the schedule data between the mobile terminal and the computer ends (a6).

Meanwhile, in the first embodiment of the present invention, when the mobile terminal 11 transmits the schedule data to the OTAF system 13, the mobile terminal 11 may transmit not only head data but all the data to the OTAF system. At this time, the OTAF system 13 transmits all the data transmitted form the mobile terminal it to the computer 12, and the computer 12 compares the head data among all the data of the mobile terminal 11 with the head data of the computer 12. As a result of the comparison, the computer 12 stores the data of the mobile terminal 11, which do not exist therein, in its memory area, and transmits its data, which do not exist in the mobile terminal 11, to the mobile terminal 11 through the OTAF system 13. Meanwhile, the mobile terminal 11 stores the data transmitted from the computer 12 in its memory area if the data do not already exist therein.

Second Embodiment

FIG. 6 is a diagram illustrating a method for synchronizing the schedule data between the mobile terminal and the computer in accordance with the second embodiment of the present invention.

Referring to FIG. 6, the computer 12 first requests the mobile terminal 11 to synchronize the schedule data. The computer 12 transmits PC_Data_Sync call data to the OTAF system 13 (b11).

The OTAF system 13 transmits First_PC_Data_Sync_Request data to the computer 12 (b12).

The mobile computer 12 transmits a head portion of the schedule data stored in its memory together with First_PC_Data Sync_Response data to the OTAF system 13 (b13).

The OTAF system 13 transmits the head portion having the schedule data transmitted from the computer 12 to the mobile terminal 11 through First_PC_Data_Sync_Request message (a11).

The mobile terminal 11 compares a head portion of the First_PC_Data_Sync_Request message with a head portion of the schedule data currently stored in the mobile terminal 11. Based on the comparison result, it is determined whether the data transmitted from the OTAF system 13 are the newest data, the same data, or previous data. The mobile terminal 11 transmits its all the newest data and the head portion of newest data of the computer 12 Lo the OTAF system 13 together with the First_PC_Data_Sync_Response message (a12).

Subsequently, the OTAF system 13 transmits all the newest data of the mobile terminal 11 and the head portion of the newest data of the computer 12 among the First_PC_Data_Sync_Response message to the computer 12 through the Internet network together with the Second_PC_Data_Sync_Request data (b14).

At this time, the computer 12 stores the newest schedule data of the mobile terminal 11 in its memory area through the received Second_PC_Data_Sync_Request data, to update the data of the mobile terminal 11. The computer 12 also transmits its all the newest schedule data to the OTAF system 13 through the Internet network together with the Second_PC_Data_Sync_Response data (b15).

The OTAF system 13 transmits the newest schedule data transmitted from the computer 12 to the mobile terminal 11 through the traffic channel together with the Second_PC_Data_Sync_Request message (a13). At this time, the mobile terminal 11 stores the received newest schedule data of the computer 12 in its memory area to update the data of the computer.

Meanwhile, the mobile terminal 11 transmits a memory confirmation message to the OTAF system 13 together with the Second_PC_Data_Sync_Response message (a14). Thus, synchronization of the schedule data between the mobile terminal and the computer ends (a14).

As aforementioned, the second embodiment of the present invention, the schedule data are synchronized between the mobile terminal and the computer in the almost same manner as the first embodiment of the present invention.

In other words, if the computer 12 transmits all the data to the mobile terminal 11 through the OTAF system 13, the mobile terminal 11 compares the head data of the computer 12 with its head data. Then, the mobile terminal 11 stores the data of the computer 12, which do not exist therein, in its memory area, and transmits its data, which are not stored in the computer 12, to the computer 12 through the OTAF system 13. The computer 12 stores the data transmitted from the mobile terminal 11 in its memory area. Thus, the data are synchronized between the computer and the mobile terminal. At this time, the data of the computer 12, which do not exist in the mobile terminal 11, and the data of the mobile terminal 11, which do not exist in the computer 12, may respectively be the newest data of the computer 12 and the mobile terminal 11.

FIGS. 7a to 7c are diagrams illustrating data formats of all the messages used in the first and second embodiments of the present invention.

As aforementioned, the method for synchronizing the data between the mobile terminal and the computer according to the present invention has the following advantages.

First, it is possible to synchronize the schedule data of the mobile terminal with the schedule data of the computer through the radio network and the Internet network.

Second, since the radio network and the Internet network are used, it is possible to synchronize the schedule data on the radio line in even case that the mobile terminal is far away from the computer.

Finally, since no additional equipment is required, it is economical.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method for synchronizing data between a mobile terminal and a computer, each of the mobile terminal and the computer alternately a first party and a second party, the method comprising:

(a) transmitting a call message from the first party to an Over-The-Air Function (OTAF) system;

(b) transmitting a request message from the OTAF system to the first party;

(c) transmitting a first response message including head data from the first party to the OTAF system;

(d) transmitting the first response message from the OTAF system to the second party;

(e) comparing, by the second party, the transmitted head data of the first party with head data of the second party;

(f) transmitting request data including newest data and a portion corresponding to newest data of the head data of the second party, in accordance with a result of said comparing, to the OTAF system;

(g) transmitting the request data from the OTAF system to the first party;

(h) storing the newest data of the second party in a memory of the first party;

(i) transmitting a second response message including the newest data of the first party to the OTAF system;

(j) transmitting the second response message from the OTAF system to the second party; and (k) storing the transmitted newest data of the first party in a memory of the second party.

2. The method of claim 1, further comprising transmitting a confirmation message to the first party through the OTAF system.

3. The method of claim 1, wherein the first party is a mobile terminal, and the step (a) is performed by pressing a synchronizing button on the mobile terminal.

4. The method of claim 1, wherein the mobile terminal and the OTAF system are connected with each other through a radio network, and the OTAF system and the computer are connected with each other via the Internet.

5. A method for synchronizing data between a mobile terminal and a computer, each of the mobile terminal and the computer selectively a first party and a second party, the method comprising:

(a) transmitting a call message from the first party to an over-the-air-function (OTAF) system;

(b) transmitting a request message from the OTAF system to the first party;

(c) transmitting a response message from the first party to the OTAF system, wherein the response message includes substantially an entire data of the first party;

(d) transmitting the response message from the OTAF system to the second party;

(e) comparing, at the second party, head data from the first party with head data of the second party;

(f) storing data not previously existing in the second party according to the comparison;

(g) transmitting request data including data of the second party not previously existing in the transmitted substantially entire data, from the second party to the the OTAF system;

(h) transmitting the request data from the OTAF system to the first party; and (i) storing the data transmitted from the second party in a memory of the first party.

6. The method of claim 5, further comprising transmitting a confirmation message to the first party through the OTAF system.

7. The method of claim 5, wherein the first party is a mobile terminal, and the step (a) is performed by pressing a synchronizing button on the mobile terminal.

8. The method of claim 5, wherein the mobile terminal and the OTAF system are connected via a radio network, and the OTAF system and the computer are connected with each other via the Internet.

9. The method of claim 5, wherein the data not previously existing in the mobile terminal and the data not previously existing in the computer are respectively newest data of the computer and the mobile terminal.

10. A system for synchronizing data comprising:

a mobile terminal;

a computer; and an OTAF provider which allows communication between the mobile terminal via radio and to the computer by a network connection for synchronizing data between said mobile terminal and said computer, wherein each of the mobile terminal and the computer are configured to initiate a synchronization request, and wherein each of the mobile terminal and the OTAF provider are adapted to send and receive an over-the-air service provisioning (OTASP) message, wherein the mobile terminal and the computer, being selectively a first party and a second party, with the OTAF provider are configured to transmit a call message from the first party to the OTAF provider, transmit a request message from the OTAF provider to the first party, transmit a first response message including head data from the first party to the OTAF provider, transmit the first response message from the OTAF provider to the second party, compare, by the second party, the transmitted head data of the first party with head data of the second party, transmit request data including newest data and a portion corresponding to newest data of the head data of the second party, in accordance with a result of said compare to the OTAF provider, transmit the request data from the OTAF provider to the first party, store the newest data of the second party in a memory of the first party, transmit a second response message including the newest data of the first party to the OTAF provider, transmit the second response message from the OTAF provider to the second party, and store the transmitted newest data of the first party in a memory of the second party.

11. The system of claim 10, wherein the mobile terminal is equipped to perform data synchronization with the computer by transmitting a request, head data and data to the OTAF.

12. The system of claim 10, wherein the OTAF is equipped to transmit a request, head data from the mobile terminal, and data to be synchronized to the computer via the network connection.

13. The system of claim 10, wherein the OTAF is equipped to transmit a request, head data from the computer, and data to be synchronized to the mobile terminal via radio.

14. The system of claim 10, wherein the mobile terminal further comprises a button which issues a request for synchronization to the OTAF.

15. The system of claim 10, wherein the OTAF further comprises means for issuing a confirmation code to the mobile terminal after successful synchronization.

16. The method of claim 1, wherein transmissions of data between the mobile terminal and the OTAF system comprise an over-the-air service provisioning (OTASP) message.

17. The method of claim 5, wherein at least one transmission between the mobile terminal and the OTAF system includes an over-the-air service provisioning (OTASP) message.

* * * * *